United States Patent
Daubenspeck et al.

(10) Patent No.: US 6,815,838 B2
(45) Date of Patent: Nov. 9, 2004

(54) LASER ALIGNMENT TARGET AND METHOD

(75) Inventors: Timothy H. Daubenspeck, Colchester, VT (US); Richard A. Gilmour, Alburg, VT (US); William T. Motsiff, Essex Junction, VT (US); Christopher D. Muzzy, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 10/079,333

(22) Filed: Feb. 20, 2002

(65) Prior Publication Data

US 2003/0156289 A1 Aug. 21, 2003

(51) Int. Cl.$^7$ .............................................. H01L 23/544
(52) U.S. Cl. ...................................... 257/797; 257/752
(58) Field of Search .......................................... 257/629

(56) References Cited

U.S. PATENT DOCUMENTS

| | | | |
|---|---|---|---|
| 3,660,157 A | | 5/1972 | Villers et al. |
| 4,632,557 A | | 12/1986 | Thompson |
| 4,824,254 A | | 4/1989 | Ohtsuka et al. |
| 5,294,975 A | | 3/1994 | Norman et al. |
| 5,528,372 A | | 6/1996 | Kawashima |
| 5,969,428 A | * | 10/1999 | Nomura et al. |
| 6,002,182 A | | 12/1999 | Madurawe |

* cited by examiner

*Primary Examiner*—Fetsum Abraham
(74) *Attorney, Agent, or Firm*—William D. Sabo; Hoffman, Warnick & D'Alessandro LLC

(57) ABSTRACT

A laser alignment target is provided having a surface that is out of plane with and has substantially the same first reflectivity as an adjacent surface of the semiconductor device, and a sidewall having a second reflectivity different than the first reflectivity. The target provides sidewalls that provide contrast for finding the target despite loss of contrast created by layers of dielectric over the target and use of short wavelength light.

20 Claims, 2 Drawing Sheets

LASER ALIGNMENT TARGET AND METHOD

BACKGROUND OF THE INVENTION

1. Technical Field

The present invention relates generally to laser alignment targets and, more particularly, to a laser alignment target with structure to compensate for loss of contrast.

2. Related Art

Semiconductor integrated circuit devices typically contain fuses which are used, for example, to invoke redundant circuit elements, create electronic chip identification or "trim" resonant circuits to achieve desired device performance. FIG. 1 illustrates a cross section of an exemplary back-end-of-line (BEOL) (wiring and insulators exposed) of a semiconductor integrated circuit device 2. Dielectric layers 4, 6 and 8, such as transparent silicon nitride, silicon dioxide or silicon oxide, contain wiring (not shown), e.g., copper, aluminum, etc. Layer 4 is in contact with a substrate 10, which is, for example, silicon containing doped regions to form transistors, etc. Uppermost dielectric layer 12 contains a wiring layer that has, as part of its design, at least one metal fuse 14. Element 16 is part of the wiring layer that contains fuse 14 and is used to connect to subsequent wiring layers or to the environment beyond the die. It is included to provide one example of how the fusing wiring layer would be connected to other features, for example, a metal layer element 18, which might be another wiring layer or a wire bond pad.

In operation, a laser fusing tool 20 is typically used to selectively delete fuses 14, or parts thereof, by illuminating the fuse wiring segment with laser radiation. The illumination causes heating/ablating of the wiring segment. To effectively heat/ablate the fuse, the laser beam must accurately illuminate the wiring segment. Accordingly, the laser beam must be aligned to the fuse wiring segment prior to illumination. Alignment is typically achieved by scanning the laser beam across both "X" and "Y" direction of an alignment target 22. The difference in reflected energy over target 22 and an adjacent field/surface 24 is used to determine the exact position of the target. Typically, the area above target 22 is highly reflective while adjacent surface(s) 24 has much lower reflectivity. The alignment target specified by the laser fusing tool vendors is commonly a reflective "L" or "T" shape, and multiple targets 22 are commonly provided. Once an "origin" is established, the laser beam can be offset by the required "x" and "y" distances to have the center of the beam illuminate the center of fuse 14 for deleting.

One obstacle to assuring that an alignment target can be ascertained is lack of contrast between the target and the adjacent, surrounding films stack. Lack of contrast can be the result of a number of issues, including residuals over or under the target and its adjacent films regions. Examples of residuals include both metallic and nonmetallic film fragments that result from faulty chemical-mechanical polish or etch back removal processes. The residuals introduce noise on the reflected light signal and in severe cases, there is sufficient residual to substantially remove any contrast between the target and adjacent regions.

One proposed remedy to the above problem has been to focus on removal and/or reduction of the residuals by additional processing. However, these remedies do not provide an adequate solution, unsatisfactorily add costs and/or introduce other undesired variation in the device structure. For example, introductions of a "clean up" etch after chemical-mechanical polish can introduce roughness in the dielectric covering the alignment target and surrounding area, and that roughness and associated changes in films stack optical thickness can degrade reflected light signal to noise ratios.

Complex film stacks that include a number of layers above the target can also destroy contrast between the alignment target and the adjacent surface. For example, referring to FIG. 1, passivation layer 26 is desirable if the wiring layer includes a non-self passivation metal such as copper (Cu). Layer 26 is over fuse 14 and alignment target 20 and, hence, must be traversed by the laser beam during scanning. Where a number of these layers are provided, further contrast problems are created. In addition, where the thickness of layers varies within a stack, further contrast difficulties can result. This is especially the case where short wavelength ultraviolet laser light (e.g., <400 nm) is used. This short wavelength light is desirable because laser spot size can be reduced relative to those of longer wavelengths. Using short wavelength light, therefore, allows for more precise ablating of fuses and smaller fuse sizes. Unfortunately, small variations of optical path length created by additional layers have a large effect on reflected energy with short wavelength lasers. It is not uncommon, in the short wavelength range, to find that insufficient contrast exists to accomplish determination of the exact position of the target.

In view of the foregoing, there is a need in the art for an alignment target capable of providing contrast despite the presence of complex film stacks and/or metal residuals.

SUMMARY OF THE INVENTION

A first aspect of the invention is directed to a laser alignment target comprising: a surface that is out of plane with and has substantially the same first reflectivity as an adjacent surface of the semiconductor device; and a sidewall having a second reflectivity different than the first reflectivity.

A second aspect of the invention provides a semiconductor device comprising: a plurality of fuses provided on a first level of interconnect; and an alignment target including: a surface that is out of plane with and has substantially the same first reflectivity as an adjacent surface; and a sidewall having a reflectivity different than the first reflectivity.

A third aspect of the invention is directed to a method of creating a laser alignment target, the method comprising: creating a surface having substantially the same first reflectivity as an adjacent surface; and forming sidewalls between the surface and the adjacent surface having a second reflectivity different than the first reflectivity.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
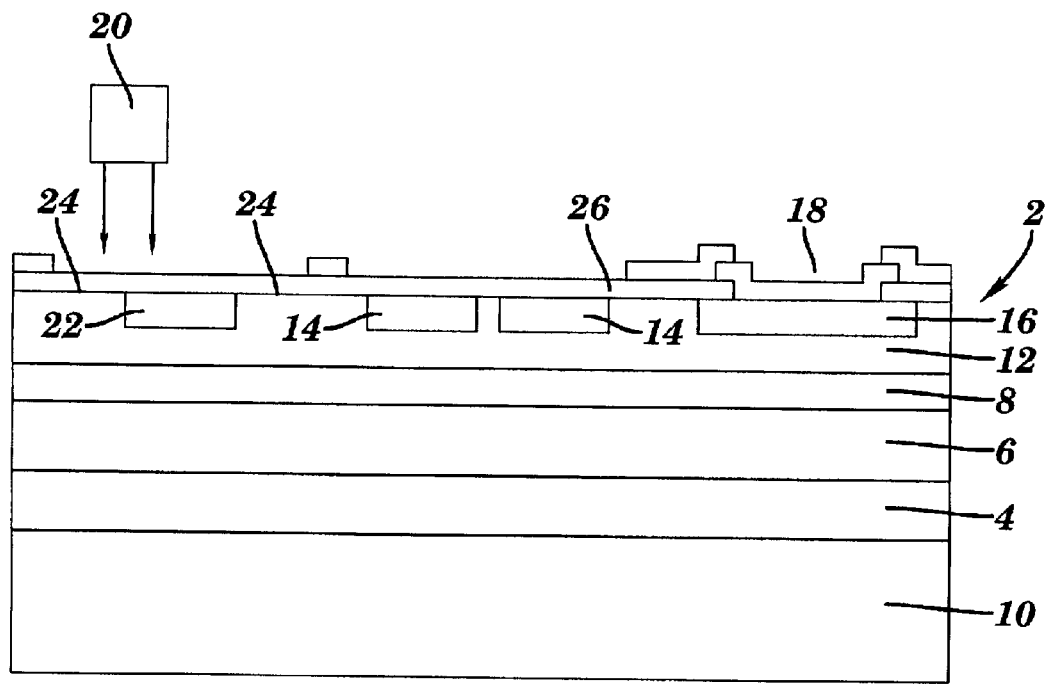
FIG. 1 shows a cross-sectional view of a prior art semiconductor device.
Figure 2:
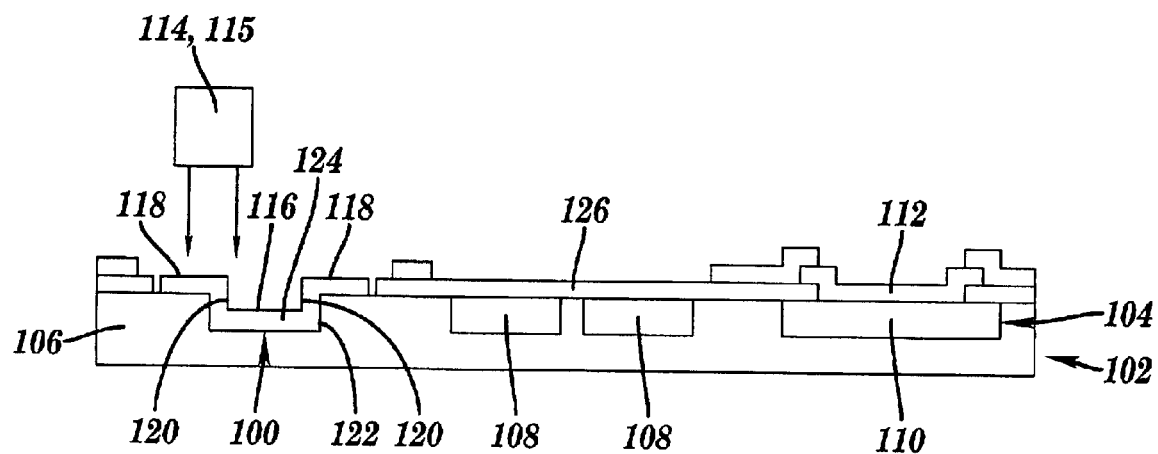
FIG. 2 shows a cross-sectional view of a first embodiment of a semiconductor device having an alignment target.

With reference to the accompanying drawings, FIG. 2 shows a cross-sectional view of an alignment target 100 on a semiconductor device 102. Semiconductor device 102 ma include a first level of interconnect or wiring layer 104 in a dielectric layer 106. (Dielectric layers below layer 106 have been removed for clarity.) Wiring layer 104 may contain a plurality of metal fuses 208 and a metal wiring element(s) 110, which may be used to connect to subsequent wiring layers or to the environment beyond the die. Another metal wiring clement(s) 112 may also be provided that is part of another wiring layer or is a wire bond pad. Wiring layer 104 may be constructed, fir example, of copper. In normal circumstances, a number of dielectric layers (not shown for clarity) will be provided above wiring layer 104. These dielectric layers may be made of, for example, silicon nitride, oxide, nitride, etc.

In operation, an image detection system 114 is used to establish an origin for fuses 108. A laser fusing tool 115 is then typically used to selectively delete fuses 108, or parts thereof, by illuminating the fuse wiring segment with laser radiation through the dielectric layers (not shown). The illumination causes heating/ablating of the wiring segment. To effectively heat/ablate the fuse, the laser beam must accurately illuminate the wiring segment. Alignment target 100 is provided for scanning by image detection system 114.

Figure 3:
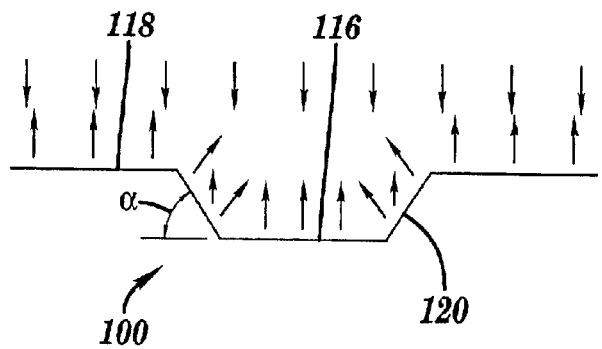
FIG. 3 shows an enlarged detail of the alignment target of FIG. 2.

Alignment target 100 includes a surface 116 that is out of plane with and has substantially the same first reflectivity as an adjacent surface (or field) 118. The first reflectivity may be created by surface 116 being made of the same material as adjacent surface 118, or nay be created by residuals in dielectric layers over one or the other surface. A sidewall 120 of target 100 has a second reflectivity different than the first reflectivity. In one embodiment the second reflectivity is lower than the first reflectivity, but any reflectivity difference providing sufficient contrast between surfaces 116, 118 may be sufficient. In one embodiment, surface 16 is substantially planar. However, it is known to provide rough target surfaces. Sidewalls 120 may have a height greater than 500 Angstroms. In addition, as shown in FIG. 3, sidewalls 120 may form an angle a with a surface 116 of greater than 60 degrees. Surface 116 may be any desired shape, e.g., substantially orthogonal segments "L" or "T" shaped.

In operation, as shown in FIG. 3, sidewalls 120 provide contrast in reflectivity between surface 116 and adjacent surface 118 such that target 100 can be ascertained by a laser beam. The contrast provided by the sidewalls is not diminished by the application of further stacks or overcoats that may include metallic residuals. Another advantage of sidewalls 120 is that they reflect low wavelength light, e.g., light having a wavelength less than 0.4 um. When the laser beam is scanned over target 100 to determine "origin", reflected energy is substantially the same from surface 116 and adjacent surface 118. Energy reflected from sidewalls 120 is reduced relative to the energy reflected from surfaces 116, 118. Metallic residuals, such as the many minute island like features formed during electroplating processes, do not obscure the differences in reflected energy. Hence, wafers that would be impossible to fuse because of residuals over the current targets are now able to be fused with target 100.

The above-described alignment target may be provided in a variety of forms. Generally, the alignment target is created by the steps of creating a surface 116 having substantially the same first reflectivity as an adjacent surface 118; and creating sidewalls 120 between surface 116 and adjacent surface 118 having a second reflectivity different than the first reflectivity. In one embodiment, shown in FIG. 2, surface 116 of target 100 is provided below adjacent surface 118. In FIG. 2, a part of wiring layer 104 has been selectively removed to create a trench or depression 122. Removal can be accomplished using any traditional and well known process, e.g., photoresist and etch techniques after the wiring pattern is formed. The first reflectivity may be provided by a metal layer 124, formed over trench 122, which creates surface 116 within the trench and adjacent surface 118 adjacent to the trench such that they have substantially the same reflectivity. Layer 124 may be provided as part of metal wiring element 112 or independently thereof. It should be recognized, however, that any now known or later developed formulations for creating the first reflectivity are considered within the scope of the invention. Accordingly, although the first reflectivity may be created by layer 124, any other formulation such as relying on metallic residuals in dielectric layers that cover target 100 to diminish contrast, may also be used.

Figure 4:
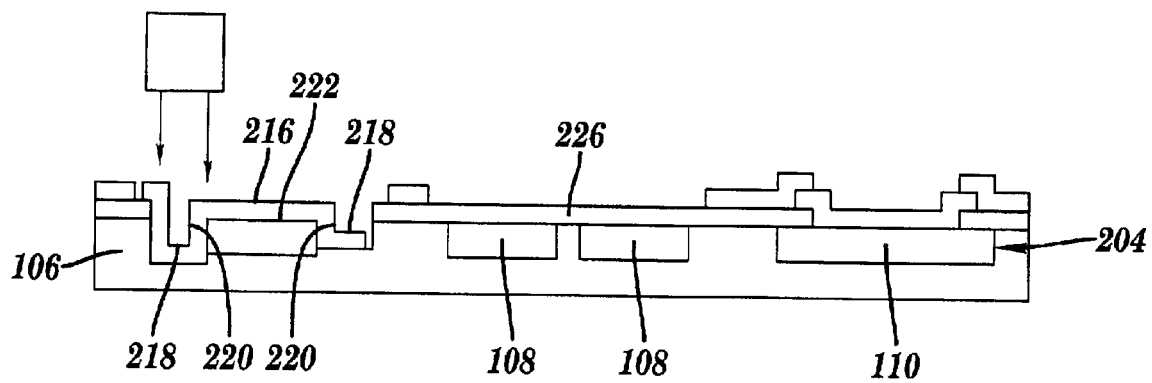
FIG. 4 shows a cross-sectional view of a second embodiment of an alignment target.

Referring to FIG. 4, an alignment target 200 may also be provided with a surface 216 above an adjacent surface (or field) 218, e.g., on a mesa, having substantially the same first reflectivity. In this embodiment, target 200 may be built as part of wiring layer 204 and used as an etch mask to create an "up" mesa feature 222. In this case, the photoresist and etch could be done immediately after wiring layer 204, or after a passivation layer 226 has been applied. Left hand and right hand sides of target 200 show two different structures that can be created. In this embodiment, sidewalls 220 are also provided with a second reflectivity different than the first reflectivity.

Figure 5:
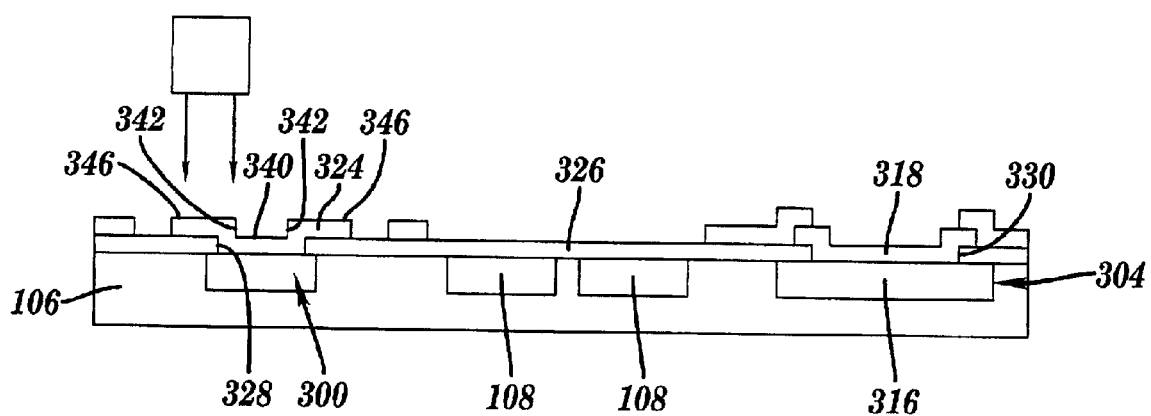
FIG. 5 shows a cross-sectional view of a third embodiment of an alignment target.

Referring to FIG. 5, another embodiment of an alignment target 300 is shown. In this setting, target 300 is provided over wiring layer 304. In particular, target 300 covers (or replaces) wiring layer 304 with a metal feature 324. A via 328 for feature 324 can be generated at the same time a window 330 is generated through passivation layer 326 to allow a metal layer 318 to contact layer 316. Feature 324 may be created simultaneously with layer 318. Feature 324 may extend, for example, approximately 10 um or more on each side of via 328. This embodiment is exceptionally easy to implement because it requires no additional masks, etc. Feature 324 provides surface 340 having substantially the same first reflectivity as adjacent surface 346. Sidewalls 342 are also provided with a second reflectivity different than the first reflectivity.

Target 100, 200, 300 may be made of any material that provides adequate difference in the energy (light) reflected from a planar surface and an inclined surface. Examples of metals (the most common application) include, but are not limited to, films stacks comprising at least one of copper, aluminum, titanium, tungstun, tantalum, etc. Metallic compounds such as titanium nitride and tantalum nitride may be included in the films stack.

The alignment target described herein is useful for use with short wavelength (e.g., <400 nm) fusing tools because it eliminates the dependence of reflected energy on the optical path lengths thru the dielectric over the fuse and the dielectric stack in the field area adjacent to the fuse. In addition, it prevents residuals found in dielectric layers above the target from diminishing the requisite contrast.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A laser alignment target comprising:
   a first surface that is out of plane with, and has substantially the same first reflectivity as, an adjacent second surface of a layer of a semiconductor device; and a sidewall between the first surface and the adjacent second surface having a second reflectivity different from the first reflectivity.

2. The laser alignment target of claim 1, wherein the first surface is below the adjacent second surface.

3. The laser alignment target of claim 1, wherein the first surface is above the adjacent second surface.

4. The laser alignment target of claim 1, wherein the sidewall has a height greater than 500 Angstroms.

5. The laser alignment target of claim 1 wherein the side forms an angle with the first surface of greater than 60 degrees.

6. The laser alignment target of claim 1, wherein the first surface is a substantially orthogonal shape.

7. The laser alignment target of claim 1, wherein the first surface is made of a material comprising at least one of copper, aluminum, titanium, tungstun and tantalum.

8. The laser alignment target of claim 1, wherein the sidewall reflects light of a wavelength less than 0.4 micrometers.

9. A semiconductor device comprising:
   a plurality of fuses provided on a first level of interconnect; and an alignment target including: a first surface that is out of plane with, and has substantially the same first reflectivity as, an adjacent second surface of a layer of the semiconductor device; and a sidewall between the first surface and the adjacent second surface having a second reflectivity different from the first reflectivity.

10. The laser alignment target of claim 1, wherein the surface is made of a material comprising at least one of copper, aluminum, titanium, tungstun and tantalum.

11. A semiconductor device comprising:
    a plurality of fuses provided on a first level of interconnect; and an alignment target including: a first surface that is out of plane with, and has substantially the same first feflectivity as, an adjacent second surface of a layer of the semiconductor device; and a sidewall betweenn the first surface and the adjacent second surface having a second reflectivity different from the first reflectivity.

12. The laser alignment target of claim 11, wherein the first surface is below he adjacent second surface.

13. The laser alignment target of claim 11, wherein the first surface is above the adjacent surface.

14. The laser alignment target of claim 11, wherein the sidewall has a height greater than 500 Angstroms.

15. The laser alignment target of claim 11, wherein the sidewall forms angle with horizontal of greater than 60 degrees.

16. A method of creating a laser alignment target, the method comprising:
    creating a first surface having substantially the same first reflectivity as an adjacent second surface; and
    forming a sidewall between the first surface and the adjacent second surface having a second reflectivity different than the first reflectivity.

17. The method of claim 16, wherein the step of creating includes creating a trench and depositing a metal over the trench to create the first surface below the adjacent second surface.

18. The method of claim 16, wherein the trench is created in a dielectric layer.

19. The method of claim 18, wherein the dielectric layer contains a wiring layer.

20. The method of claim 16, wherein the step of creating includes covering a wiring element with a metal to create the first surface above the adjacent second surface.

* * * * *